J. C. BABST & H. H. PIERCE.
FIRE HOSE COUPLING.
APPLICATION FILED FEB. 28, 1910.
999,946.
Patented Aug. 8, 1911.
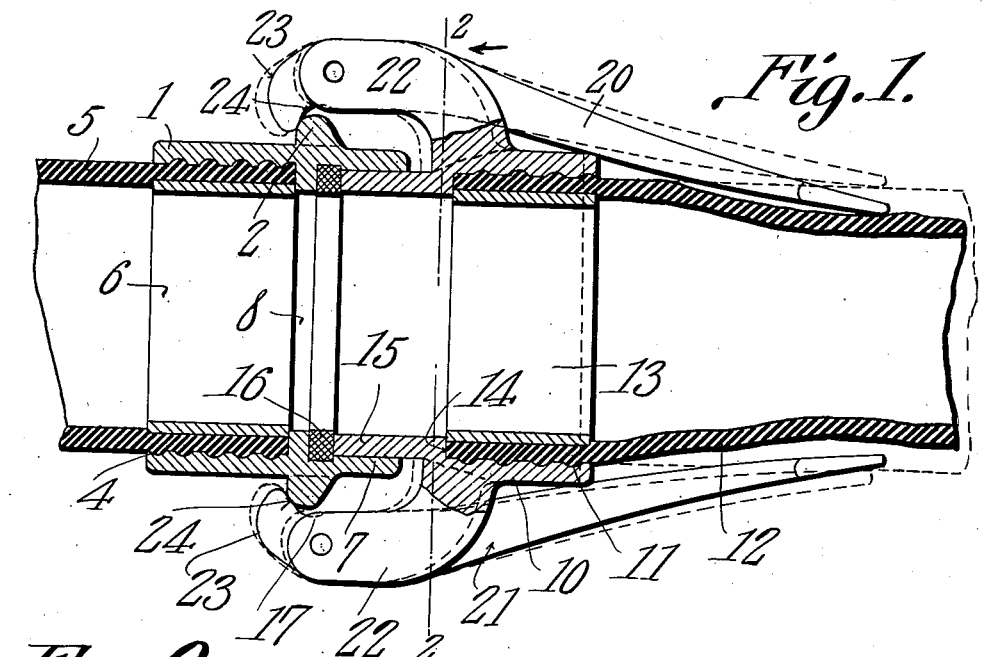
*Fig. 1.*
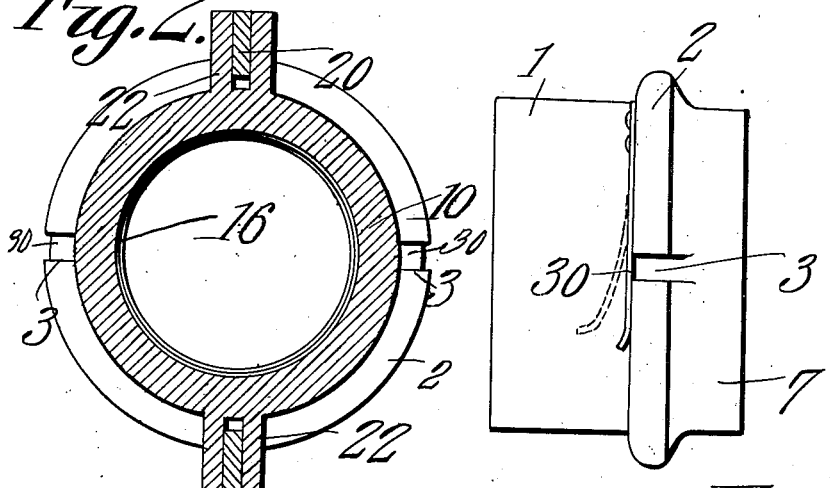
*Fig. 2.*
*Fig. 3.*
Witnesses
Inventors
Joseph C. Babst
Henry H. Pierce
By
Attorneys

UNITED STATES PATENT OFFICE.

JOSEPH C. BABST AND HENRY H. PIERCE, OF BARNESVILLE, MINNESOTA.

FIRE-HOSE COUPLING.

999,946.  Specification of Letters Patent.  Patented Aug. 8, 1911.

Application filed February 28, 1910. Serial No. 546,381.

*To all whom it may concern:*

Be it known that we, JOSEPH C. BABST and HENRY H. PIERCE, citizens of the United States, residing at Barnesville, in the county of Clay and State of Minnesota, have invented a new and useful Fire-Hose Coupling, of which the following is a specification.

This invention relates to a hose coupling which is adapted to be used on all kinds of hose such for example as fire hose, garden and lawn hose, air and steam hose.

The object of the invention is to provide a form of hose coupling which is controlled or regulated by the pressure within the hose, whereby the expasion of the hose causes the coupling to be held securely in position and to become tighter as the expansion of the hose increases.

A further object of the invention is to provide improved means for coupling and uncoupling the different members of the device.

With the foregoing and other objects in view which will appear as the description proceeds, the invention resides in the combination and arrangement of parts and in the details of construction hereinafter described and claimed, it being understood that changes in the precise embodiments of invention herein disclosed can be made within the scope of the claim without departing from the spirit of the invention.

In the accompanying drawing forming part of this specification, Figure 1 is a longitudinal section through a hose coupling constructed in accordance with the invention, the clamping levers being shown in elevation. Fig. 2 is a transverse section on the line 2—2 of Fig. 1. Fig. 3 is a side elevation of the female member of the coupling.

Like reference numerals indicate corresponding parts in the different figures of the drawing.

The reference numeral 1 indicates the female member of the coupling which is formed exteriorly with a rib 2 having therein a plurality of notches or cut away portions 3 which preferably are located at opposite sides of the member 1. The member 1, interiorly thereof, at its outer end, is threaded as indicated at 4, to receive one end 5 of the hose, an expansion ring 6 being fitted into the hose 5 in order to permit the same to be readily screwed into place in the member 1. At its opposite end, the member 1 interiorly thereof is formed with a smooth portion 7, the smooth portion 7 being separated from the threaded portion 4 by means of an internally disposed annular rib 8.

The male member 10 of the coupling preferably is formed at the rear thereof with internal threads 11 by means of which the hose 12 may be screwed into place, said hose containing an expansion ring 13. The forward end of the threaded portion 11 is defined by an annular shoulder 14 which forms an abutment for the forward end of the hose 12 and expansion ring 13. The shoulder 14 is produced by the rear end of a tubular extension 15 which fits into the smooth portion 7 of the member 1. A gasket or washer 16 is fitted into the rear end of the smooth portion 7 of the member 1 and is expanded outwardly into a groove 17 formed in the member 1, the gasket 16 resting at its rear end against the rib 8 and being adapted to be compressed between the tubular extension 15 of the member 10 and the rib 8 of the member 1 so as to produce a tight joint and thus prevent the escape of fluid.

The means for drawing the members of the couplings together, preferably includes a pair of levers 20 and 21 each of which is mounted upon an outwardly and forwardly extending arm 22 of the member 10, the two arms 22 surrounding the forward end of the member 1 at some distance therefrom. The forward end of each lever 20 and 21 is curved inwardly as indicated at 23 and is formed with a cam face 24 adapted to engage the rib 2 of the member 1. The elongated rear ends of the levers 20 and 21 bear against the hose 12 so as normally to compress the same. When however, the hose 12 expands under the pressure of the contents thereof, the long rear ends of the levers are thrown outward thus causing the cam faces 24 to engage the rib 2 of the member 1 and draw the members together, thus placing the gasket or washer 16 under suitable compression and forming a fluid tight joint.

In fitting the two members of the couplings together, the levers 23 are caused to extend through the notches 3 in the rib 2, thus forcing back the spring 30 which covers each of the notches 3. When the forward ends of the levers have passed through the notches 3 the two members are rotated with respect to each other so as to cause the levers to move away from the notches, after which the springs 30 close and thus prevent any accidental disengagement of the members of the coupling. When it is desired to disengage the couplings, the springs 30 are moved into the dotted line position in Fig. 3 after which it is possible to rotate the two members of the couplings and separate the same by withdrawing the levers through the notches 3.

The coupling of the present invention is strong, simple, durable and inexpensive in construction as well as thoroughly efficient in operation. It will be apparent that it is readily operated by the pressure within the hose and that the tightness of the joint depends upon the strength of the pressure. When the pressure is lowered it is not necessary to have so tight a joint, the parts accommodating themselves. When the pressure within the hose is strong, the two members of the coupling are pressed tightly together so as to prevent the escape of any fluid.

What is claimed as new is:

A hose coupling comprising a female member having one end of its interior threaded and the other end smooth, the smooth end being formed at the inner end thereof with a groove, an annular rib separating the threaded portion from the smooth portion, said member being formed with an external rib having a plurality of notches therein and a plurality of springs covering said notches, a male member having at its rear end a threaded interior defined at the forward end thereof by an annular shoulder, a tubular extension in advance of said shoulder adapted to fit into the smooth portion of the other member, said male member having a plurality of outwardly and forwardly extending arms, levers mounted in said arms and having cam faces adapted to engage the annular rib of the female member, said levers being adapted to be expanded by the pressure within the hose, to draw the two members of the coupling together.

In testimony that we claim the foregoing as our own, we have hereto affixed our signatures in the presence of two witnesses.

JOSEPH C. BABST.
HENRY H. PIERCE.

Witnesses:
J. H. FISCH,
ANDREW F. PETERSON.